United States Patent [19]

Zeiger et al.

[11] Patent Number: 4,970,090
[45] Date of Patent: Nov. 13, 1990

[54] ENHANCED COCOA EXTRACT FLAVORINGS

[75] Inventors: William N. Zeiger, Reisterstown; Joni M. Diedrich, Baltimore, both of Md.

[73] Assignee: McCormick & Company, Inc., Hunt Valley, Md.

[21] Appl. No.: 472,439

[22] Filed: Jan. 31, 1990

Related U.S. Application Data

[60] Continuation-in-part of Ser. No. 251,037, Sep. 26, 1988, abandoned, which is a division of Ser. No. 127,400, Dec. 2, 1987, abandoned.

[51] Int. Cl.$^5$ .................... A23L 1/221; A23G 1/00
[52] U.S. Cl. .................... 426/650; 426/631; 426/533; 426/655; 426/430; 426/520
[58] Field of Search .............. 426/631, 655, 533, 650, 426/430, 520

[56] References Cited

U.S. PATENT DOCUMENTS

| | | | |
|---|---|---|---|
| 97,889 | 12/1869 | Crosman et al. | 426/520 |
| 3,112,204 | 11/1963 | Yanick | 426/520 X |

FOREIGN PATENT DOCUMENTS

| | | | |
|---|---|---|---|
| 14452 | 4/1899 | United Kingdom | 426/520 |

OTHER PUBLICATIONS

Furia et al, Fenaroli's Handbook of Flavor Ingredients, vol. 2, 1975, CRC Press: Cleveland, Ohio, p. 618.

*Primary Examiner*—Joseph Golian
*Attorney, Agent, or Firm*—Cushman, Darby & Cushman

[57] ABSTRACT

A process for enhancing the flavor of ethanol extracts including the step of heating a volume of the extract in a sealed container at a temperature between 125°–150° C. for a period of time sufficient to cause a change in flavor. The aforesaid heating step may be conducted at a pressure of 70-135 psi. The resulting enhanced flavoring product is encompassed within the invention.

4 Claims, 14 Drawing Sheets

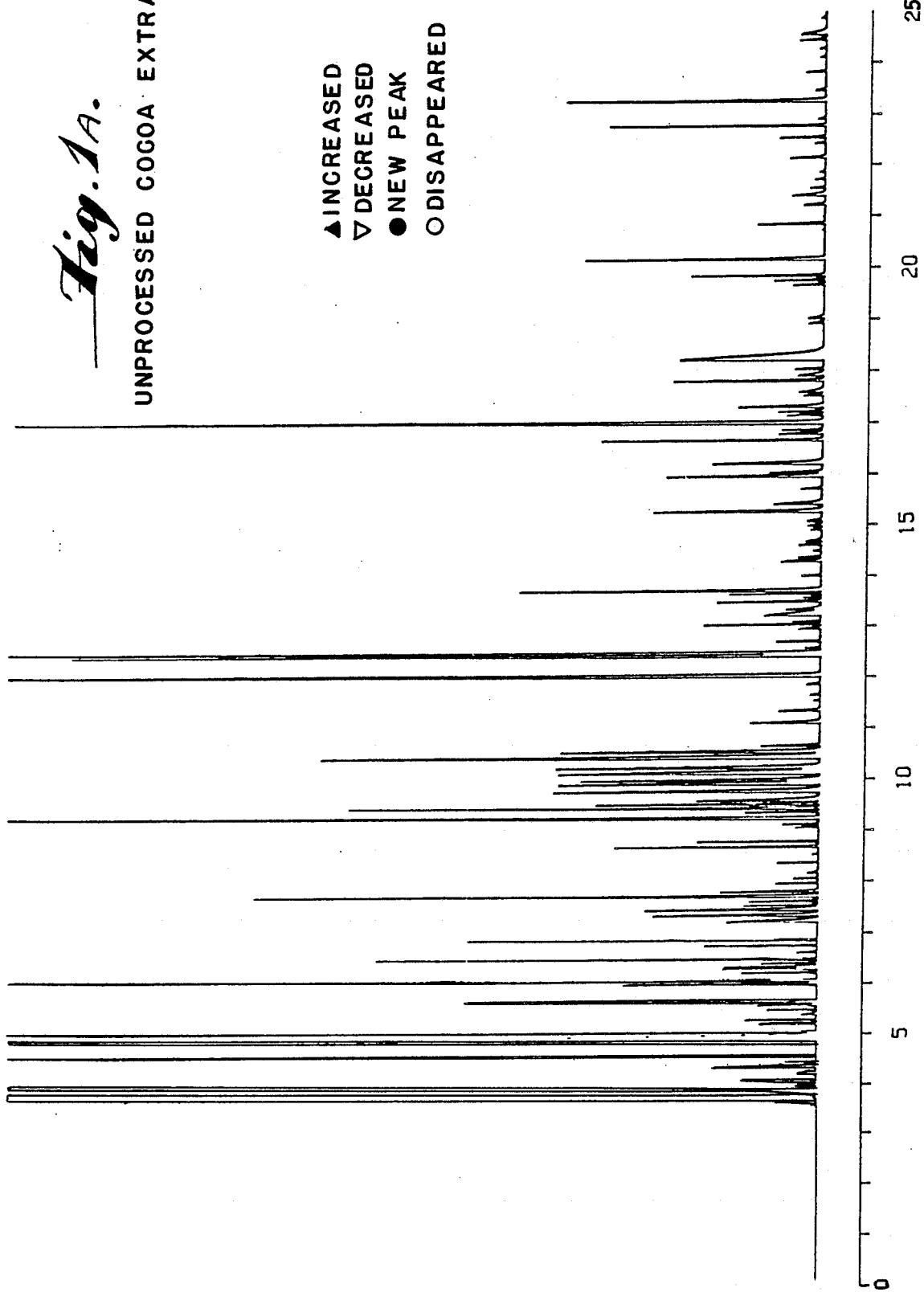
Fig. 1A. UNPROCESSED COCOA EXTRACT
▲ INCREASED
▽ DECREASED
● NEW PEAK
○ DISAPPEARED

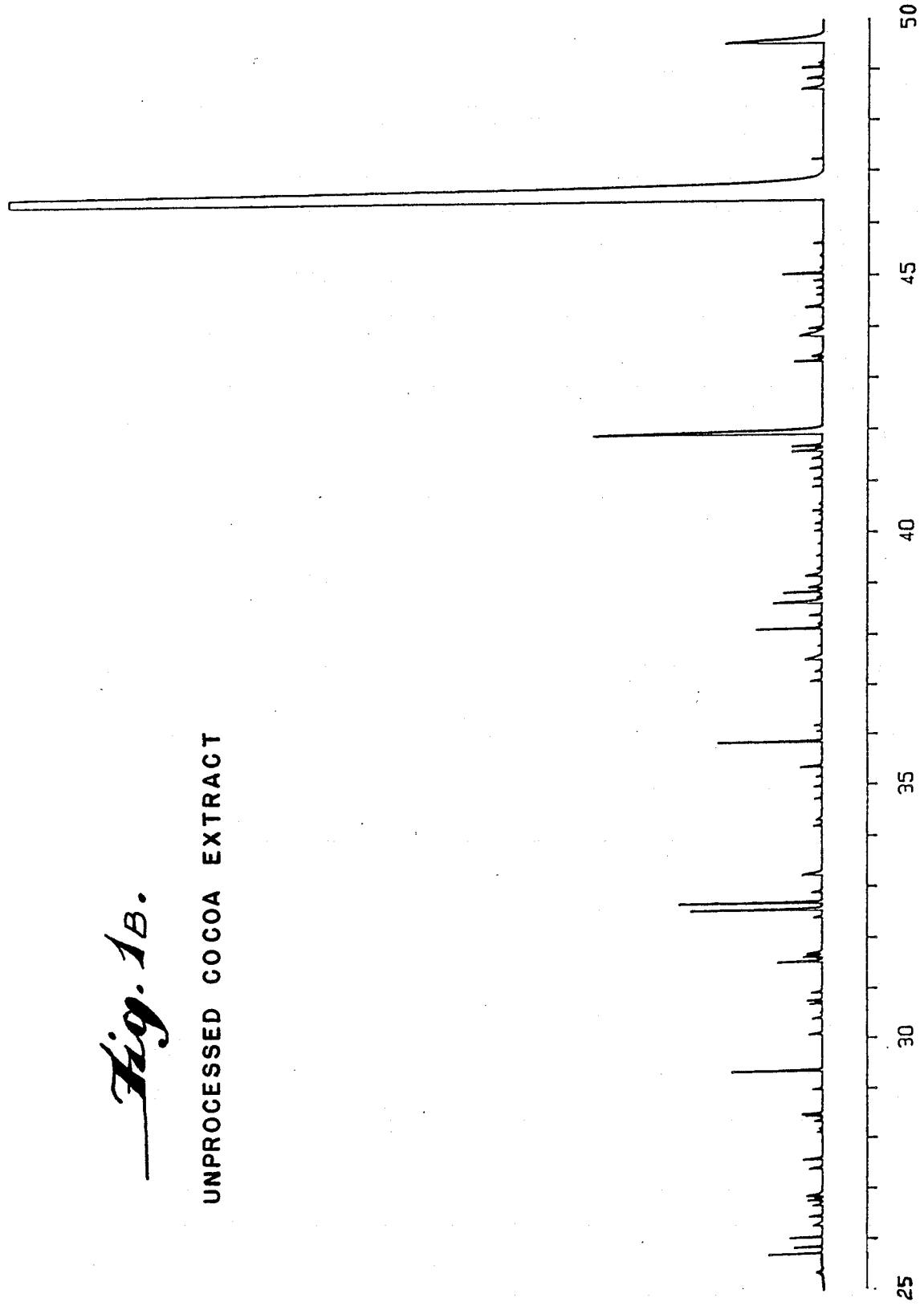
Fig. 1B. UNPROCESSED COCOA EXTRACT

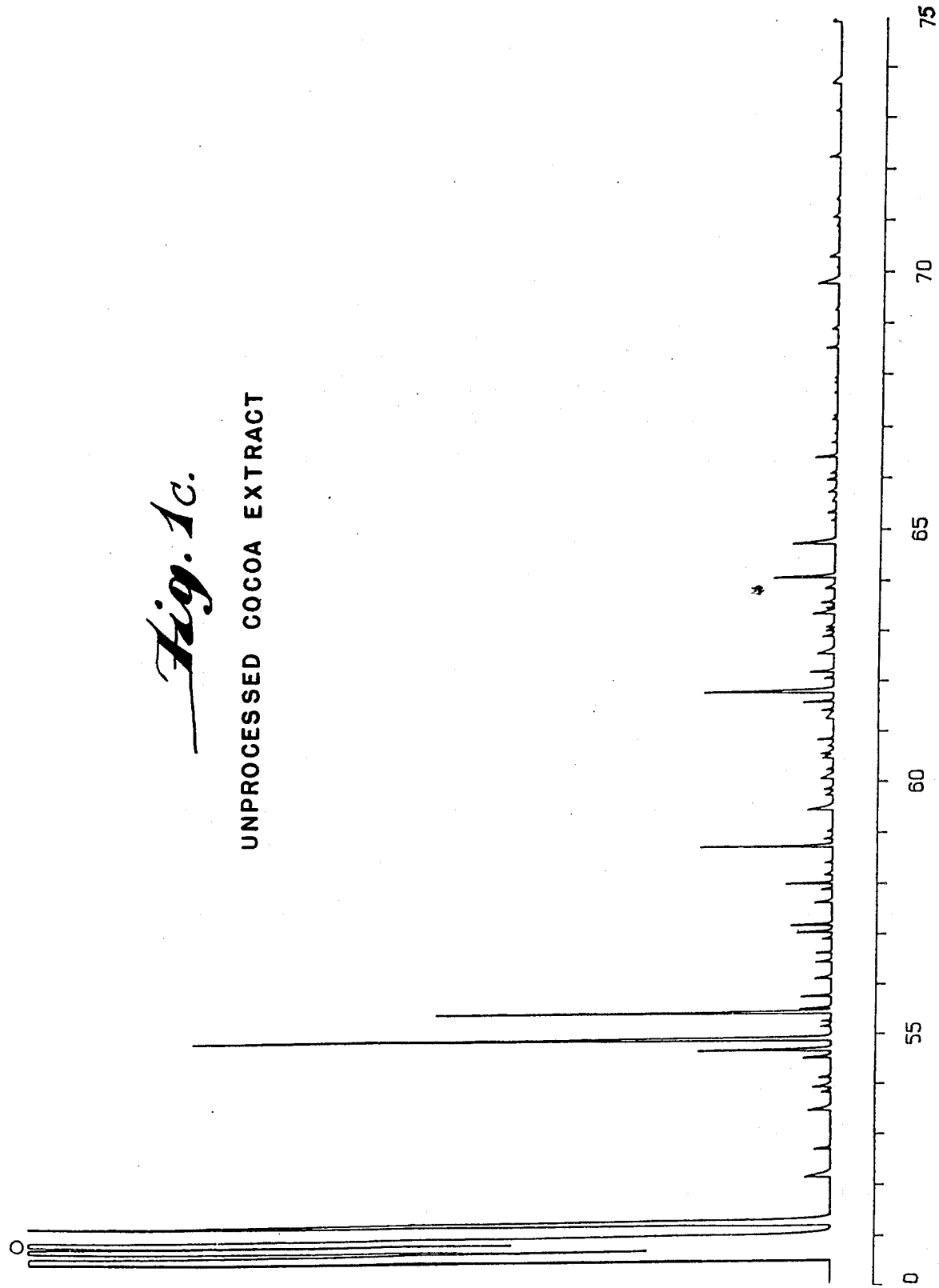

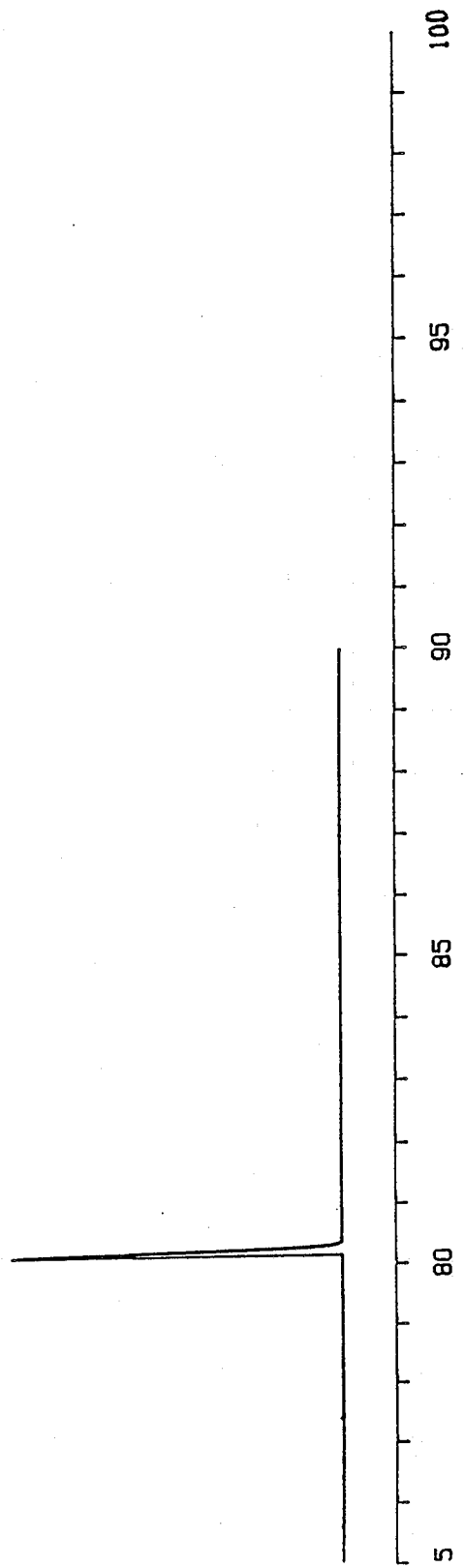
Fig. 1D. UNPROCESSED COCOA EXTRACT

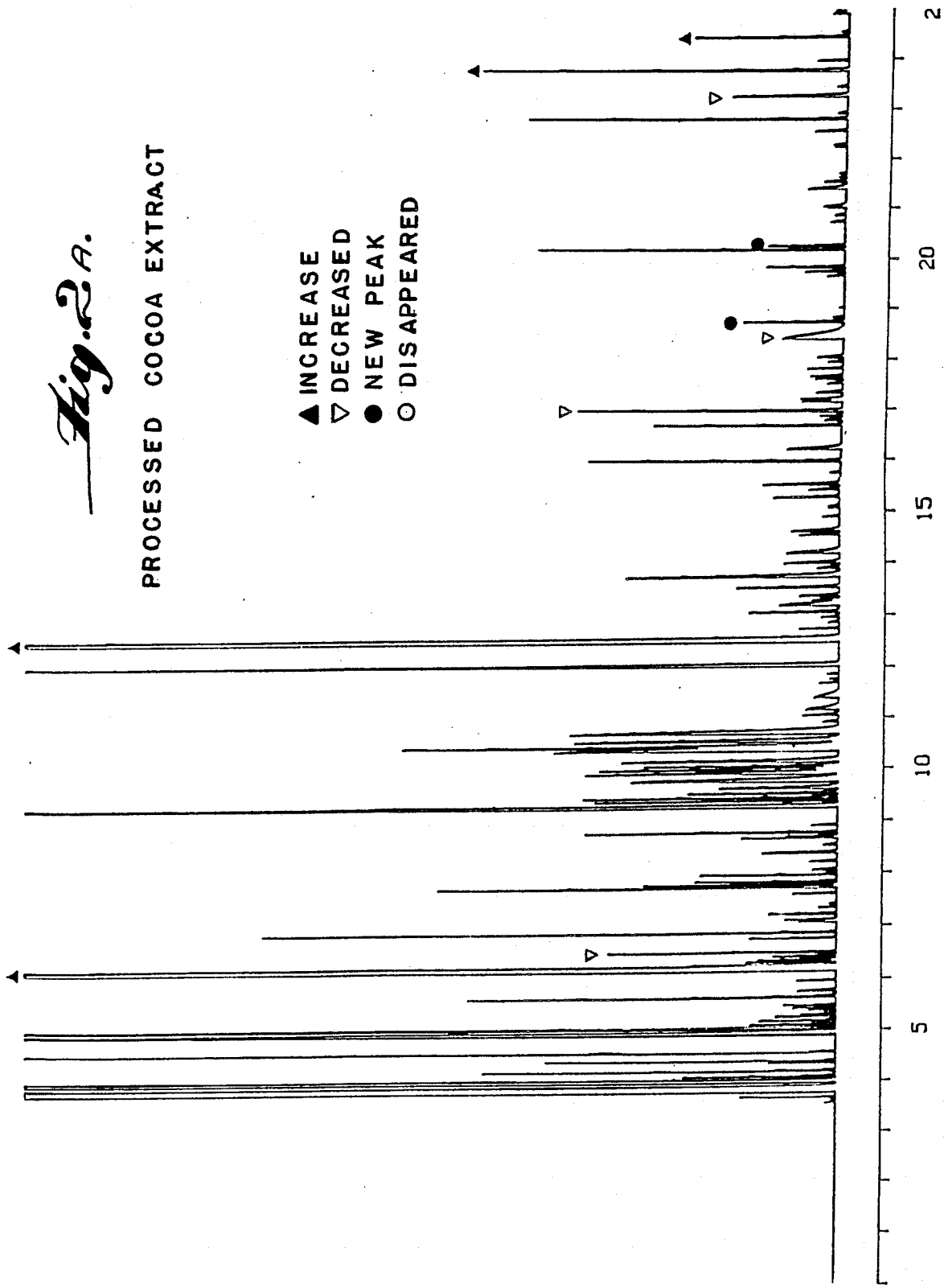
Fig. 2A. PROCESSED COCOA EXTRACT

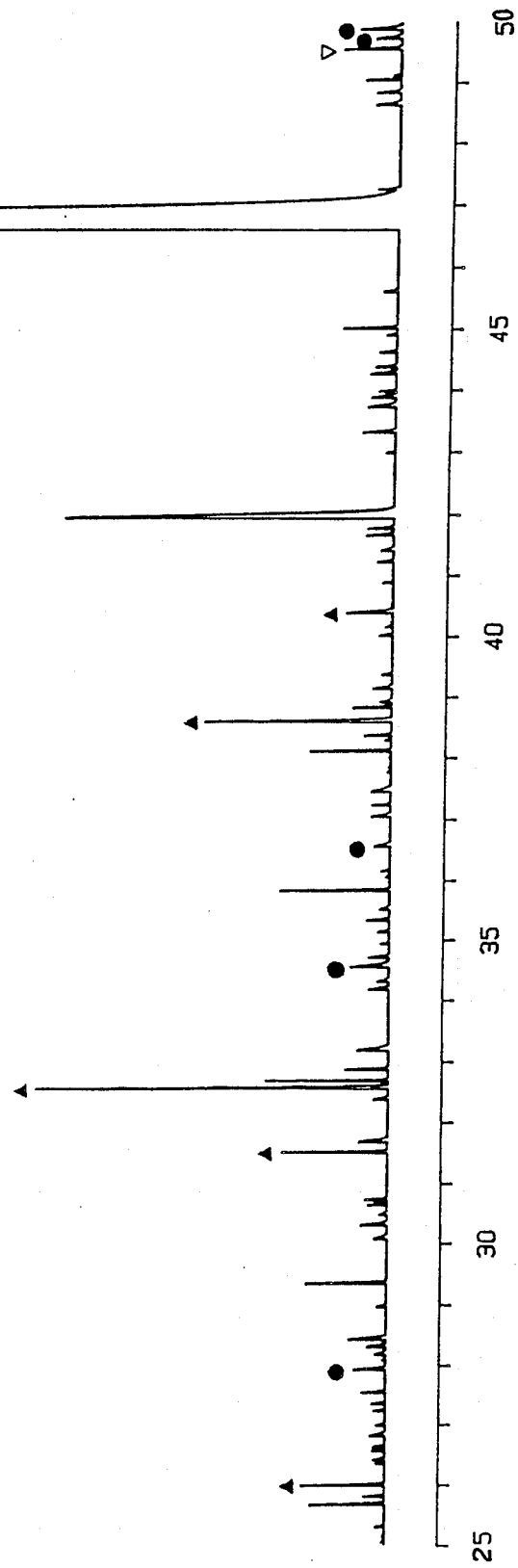
Fig. 2B. PROCESSED COCOA EXTRACT

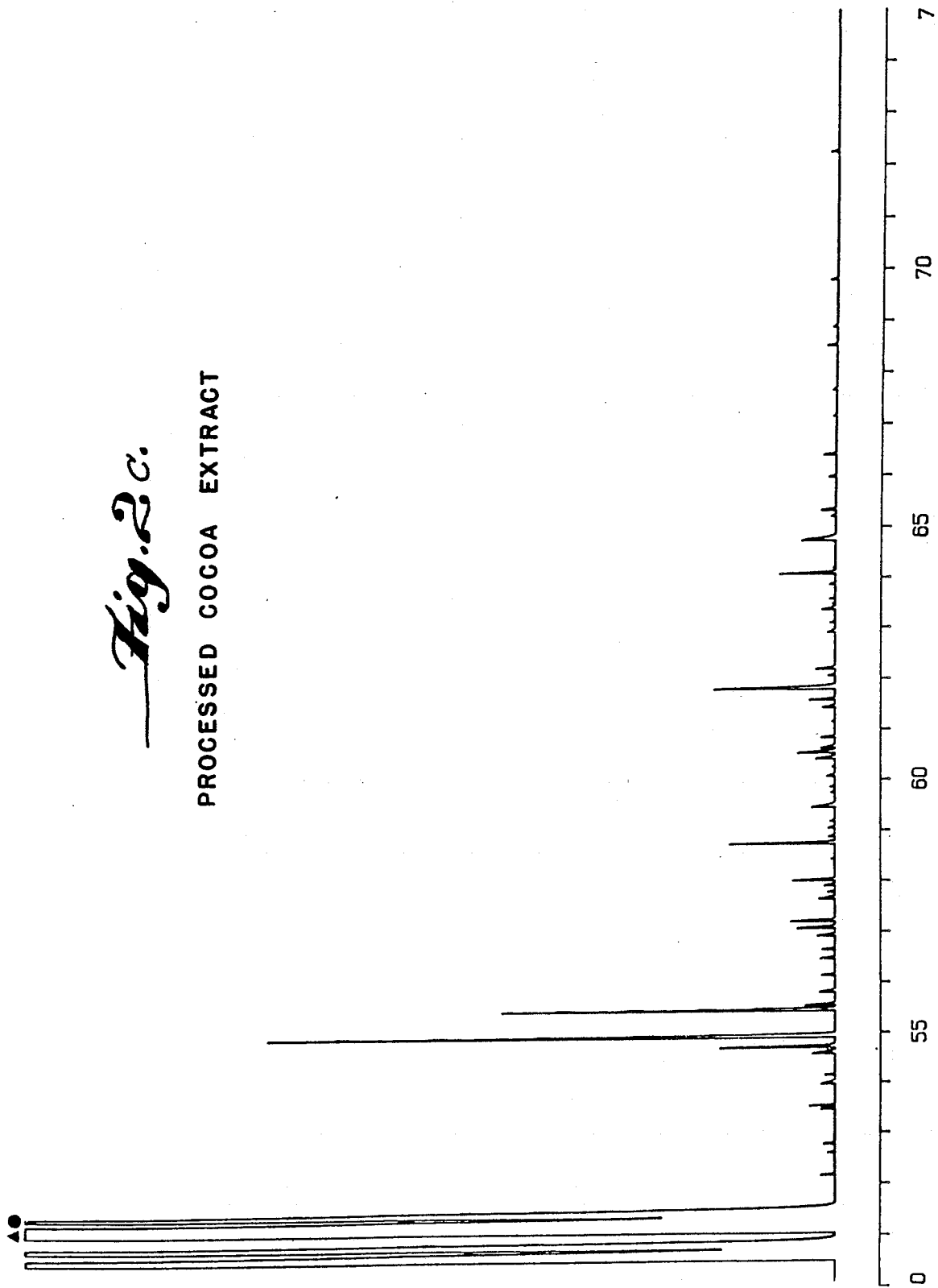
Fig. 2c. PROCESSED COCOA EXTRACT

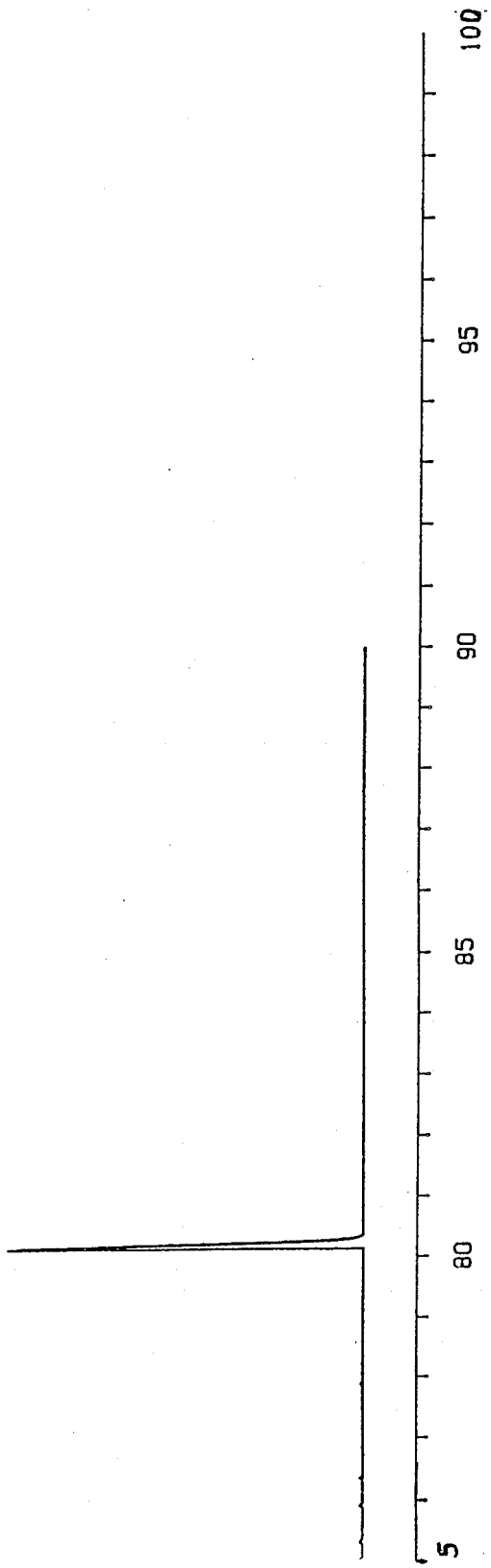
Fig. 2D. PROCESSED COCOA EXTRACT

UNPROCESSED RUM

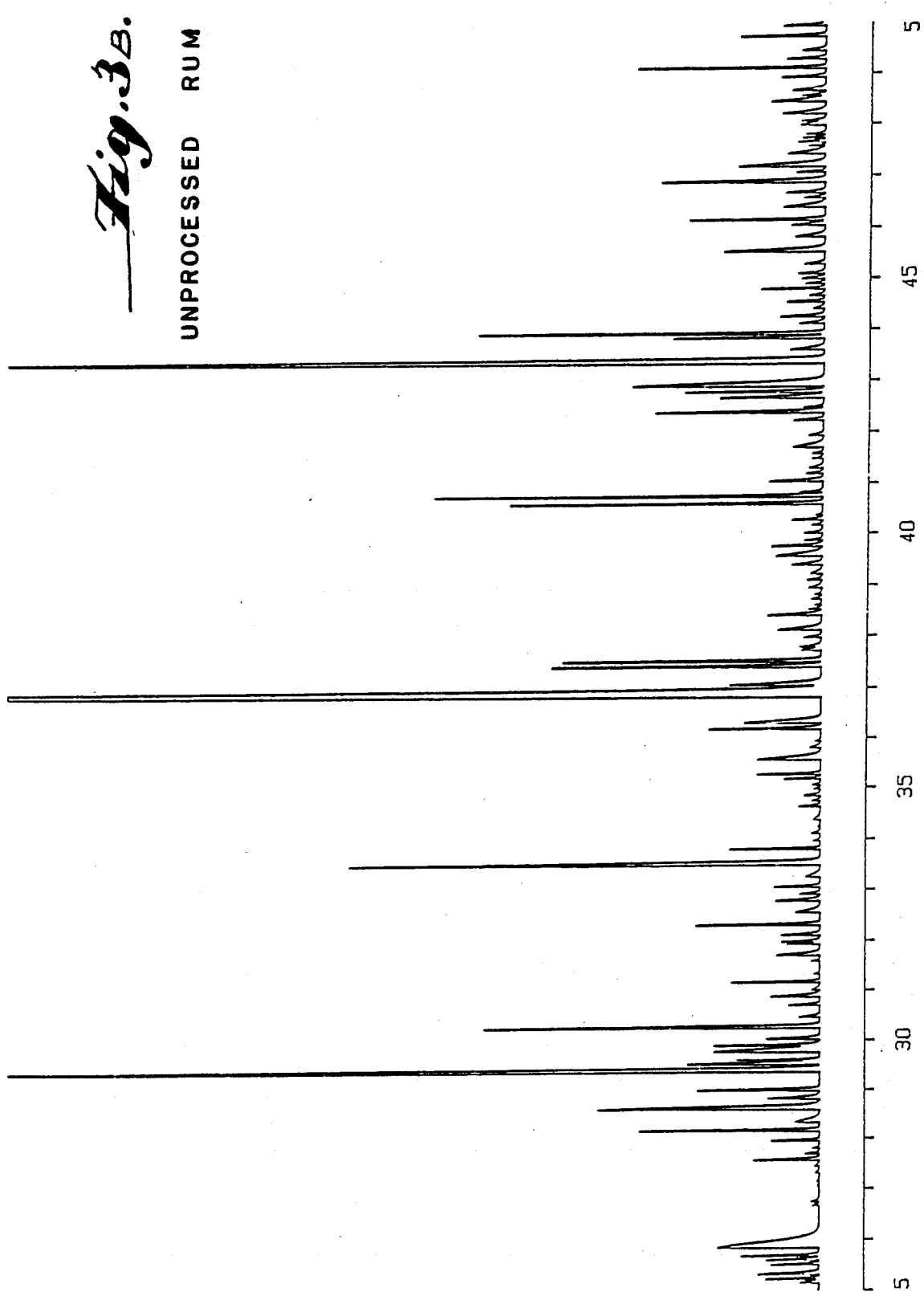
Fig. 3B. UNPROCESSED RUM

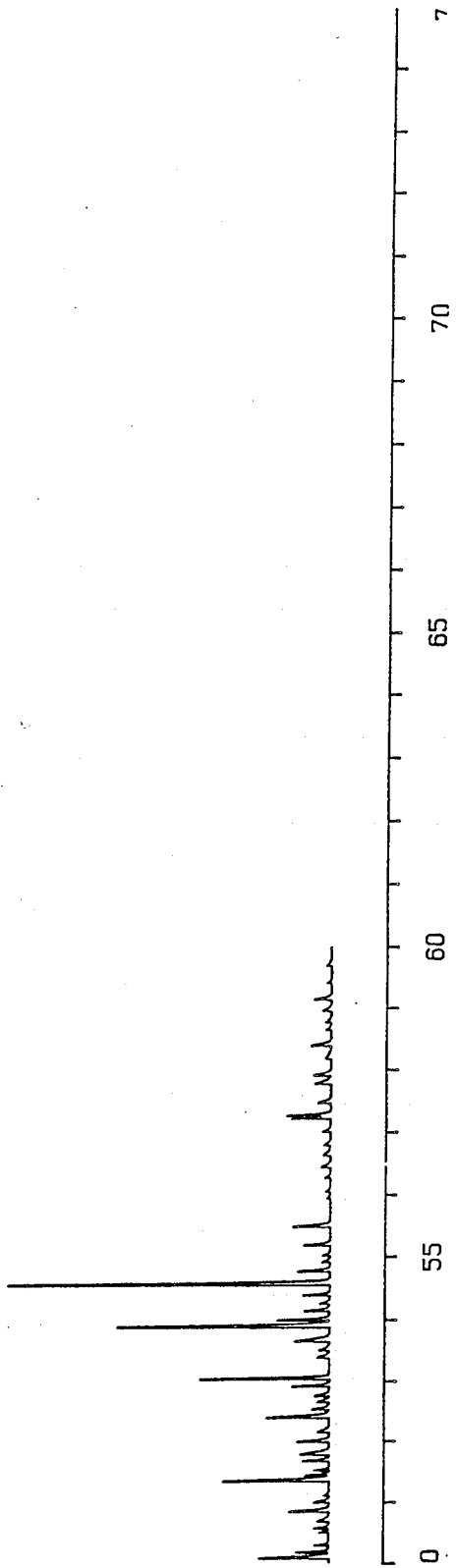
Fig. 3c. UNPROCESSED RUM.

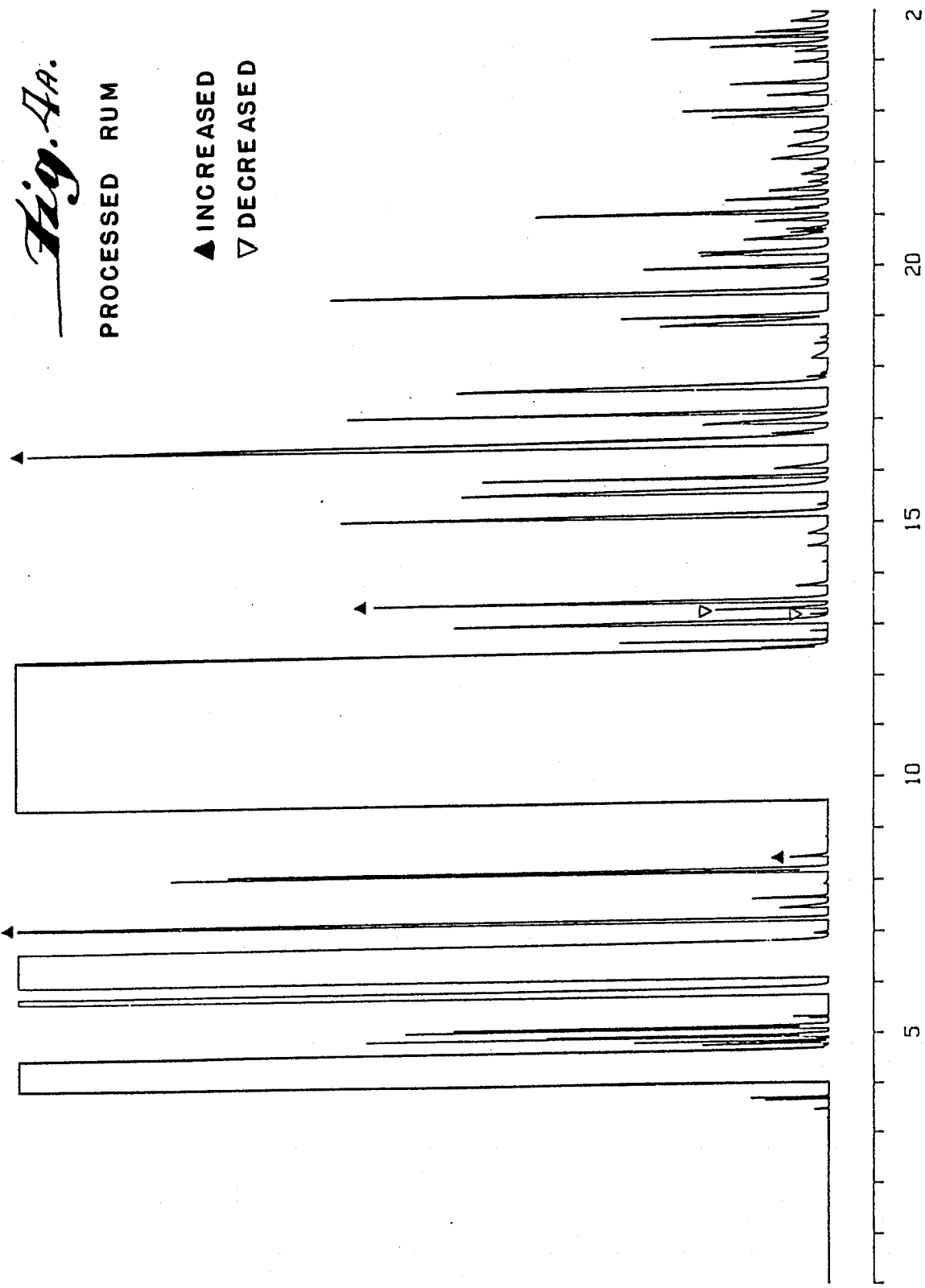
Fig. 4A. PROCESSED RUM
▲ INCREASED
▽ DECREASED

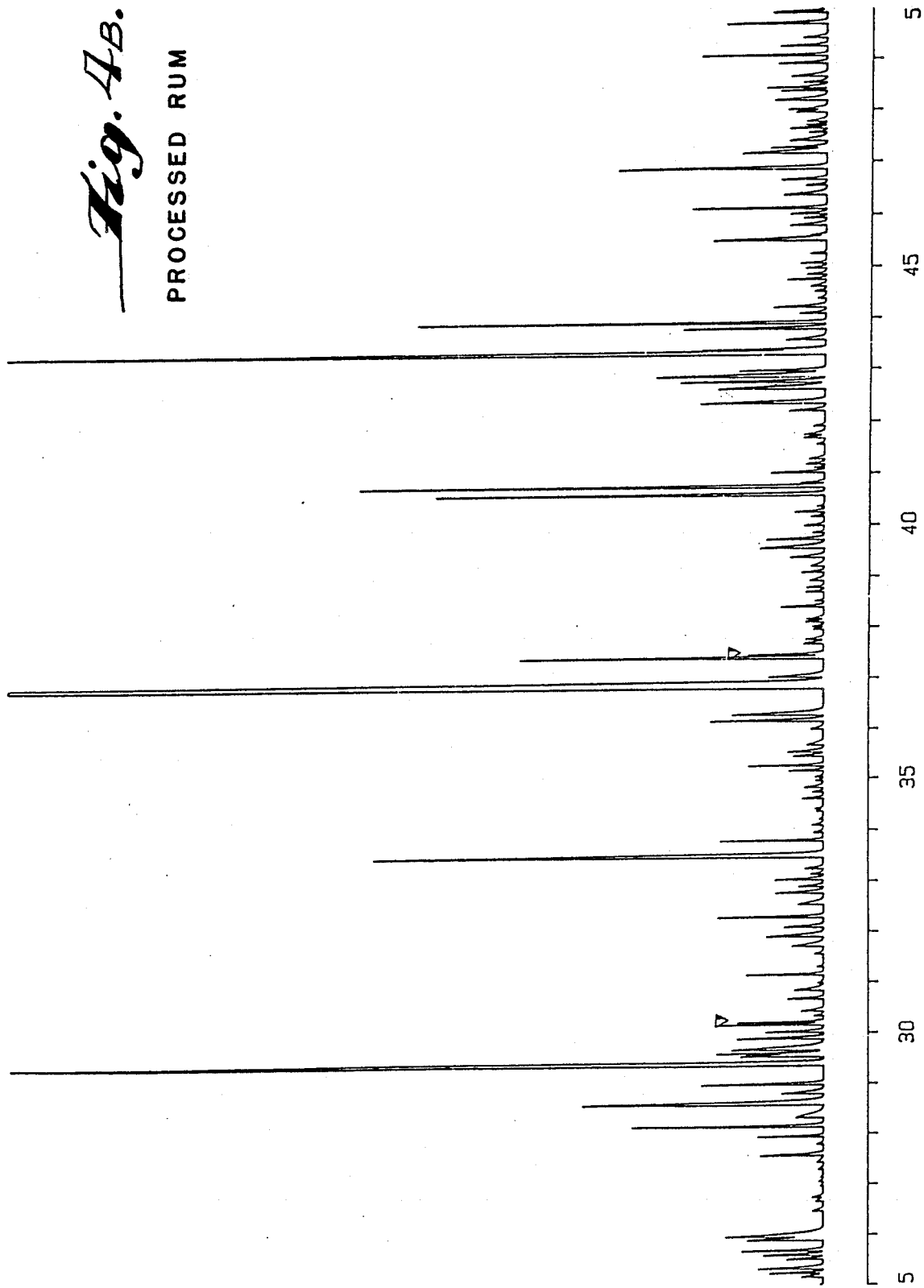
Fig. 4B. PROCESSED RUM

PROCESSED RUM

ENHANCED COCOA EXTRACT FLAVORINGS

This is a continuation-in-part of application Ser. No. 251,037, filed Sept. 26, 1988, now abandoned, which is a division of Ser. No. 127,400, filed Dec. 2, 1987, now abandoned.

BACKGROUND AND SUMMARY OF THE INVENTION

The present invention generally relates to food and beverage flavorings. More particularly the invention relates to processes for enhancing the strength of flavorings, especially those dissolved in ethanol, and relates to the process end product, i.e, the enhanced flavoring.

Broadly described, ethanol based flavorings are widely employed in the food and beverage industry including such flavorings as distilled spirits, e.g. rum, and other extracts, e.g. cocoa extract. In the case of distilled spirits, the ethanol and water solvent resulting from natural fermentation, extracts flavorings from the fermenting solids, and the flavoring carrys forward in the distillation process to the end product. In the case of an extract such as cocoa extract, while there generally is no distillation process, the cocoa is subjected to a water or water-ethanol solvent which extracts the cocoa flavoring.

A common problem in the food and beverage industry is to employ a minimum amount of flavoring to create the greatest flavoring impact. A smaller volume of stronger flavoring is desired.

DETAILED DESCRIPTION OF THE INVENTION

Figure 3A:
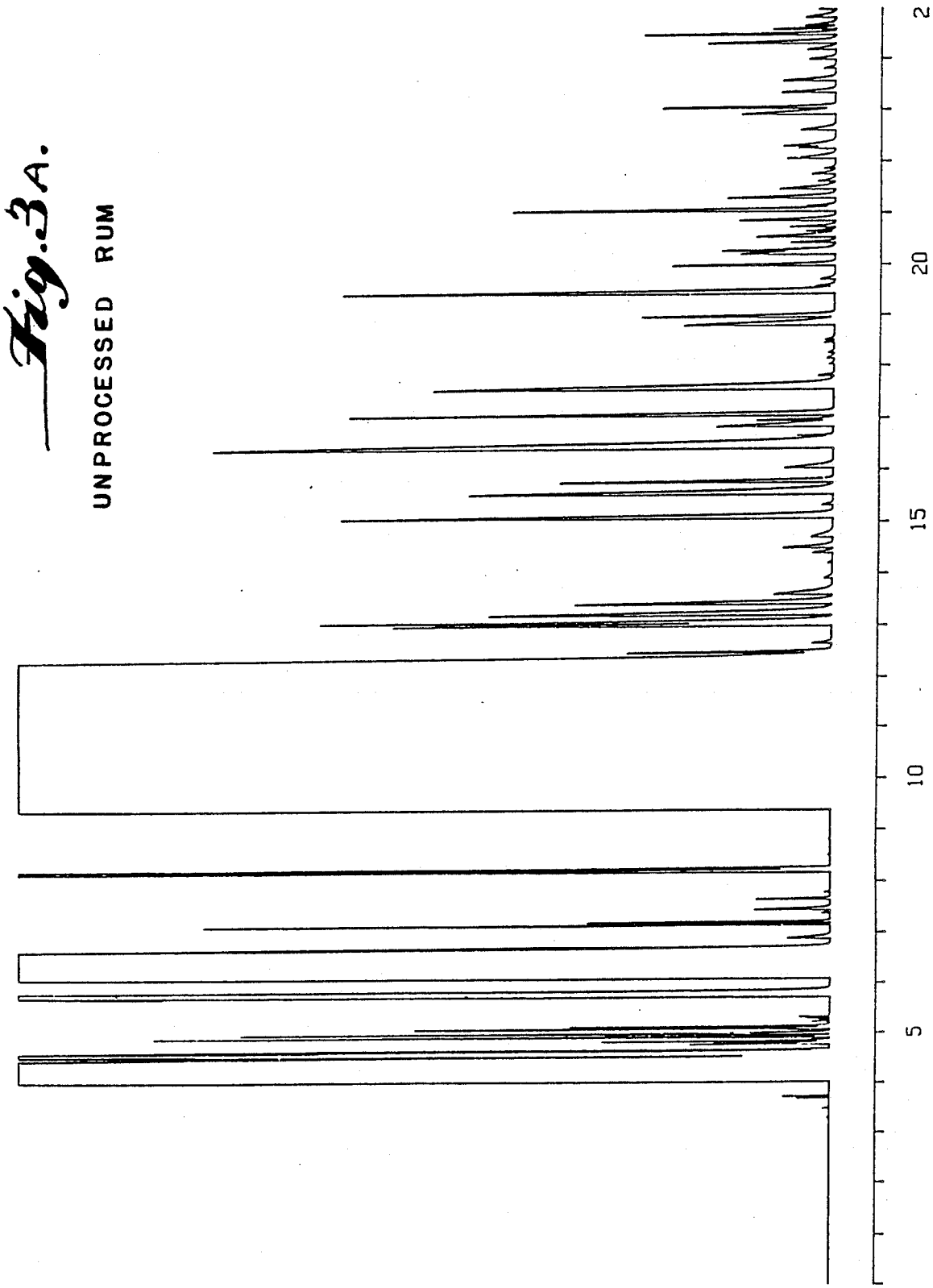

The present invention thus provides in its broadest aspects a process for enhancing the strength of flavoring extracts. More particularly, the present invention includes subjecting a volume of water or ethanol extract flavoring in a sealed container to an elevated temperature (and optionally to an elevated pressure) for a predetermined amount of time to produce an enhanced flavoring product. The present invention includes the enhanced flavoring product.

In one embodiment of the present invention, the extract which may be a water or ethanol extract will preferably have approximately 70% alcohol but not less than 40%. The extract should be substantially free of any sugar other than that extracted from the roasted cocoa beans themselves. In addition, no coloring matter should be added. In preparing the extract, coarsely chopped, preferably ¼" roasted cocoa beans or nibs are extracted twice with a mixture of water and alcohol for a suitable period of time. The two extracts are combined and the alcohol remaining in the extracted cocoa beans is recovered by steamed distillation and added to the previous two extracts to yield the final product which contains the total flavor and odorous principles extractable from the cocoa beans. The quantity of cocoa being used per gallon of finished extract is usually between 3 and 10 pounds and the alcohol concentration as noted above, should be between 40 and 70 %. The temperature of extraction is usually between room temperature 21° C. and 66° C. and the time period for extraction may vary from 4 to 24 hours. A volume of the ethanol extract is heated in a sealed container at a temperature between 125° to 150° C. for a time period of 3.5 to 4.5 hours. In a further embodiment of the present invention, a volume of the ethanol extract is not only heated at a temperature between 125° to 150° C. for 3.5 to 4.5 hours, but the volume is also heated under pressure, ranging from 70 to 135 psi. Because of the complex nature of flavorings, no attempt will be made to describe the nature of the chemical changes which take place when an ethanol extract is subjected to the present process. As will be shown in the Examples (see below), however, there is a definite change in the chemical nature of the extract after being subjected to the present process.

In evaluating the effect of temperature in the present process, there is a slight flavor change at a narrow range of temperatures of 70°-75° C. with the most significant flavor change occurring in the range of 125° to 150° C. Above 150° C. there are dramatic flavor changes, however, the results are not favorable.

These as well as other objects and advantages of the present invention will be better understood by carefully reading the following Examples of the presently preferred embodiments of this invention in conjunction with the accompanied drawings, of which: FIGS. 1 A–D is a gas chromatogram of cocoa extract not subjected to the present process (unprocessed) compared to the chromatogram of cocoa extract subjected to the present process (processed) as shown in FIGS. 2 A–D.

Figure 4C:
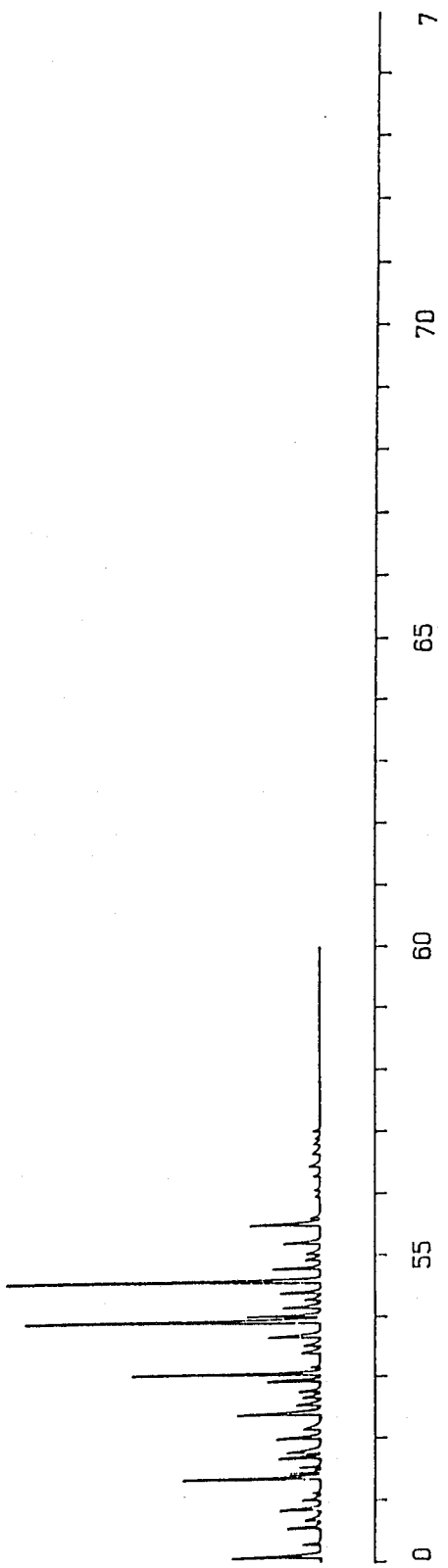

FIGS. 2 A–D is a gas chromatogram of cocoa extract subjected to the present process (processed) compared to the gas chromatogram of cocoa extract not subjected to the present process (unprocessed) as shown in FIGS. 1 A–D;

FIGS. 3 A–C is a gas chromatogram of rum which has not been subjected to the present process (unprocessed) compared to the gas chromatogram of rum which has been subjected to the present process (processed) as shown in FIGS. 4 A–C; and FIGS. 4 A–C is a gas chromatogram of rum which has been subjected to the present process (processed) compared to the gas chromatogram of rum which has not been subjected to the present process (unprocessed) as shown in FIGS. 3 A–C.

The following examples are not intended to restrict the present invention but are merely intended to illustrate the invention:

EXAMPLE 1

Samples of cocoa extract were subjected to the present process under controlled operational parameters.

Sample A - A sample of 300 ml of cocoa extract was held in a pressure reactor for four hours at 125° C. at 70 psi. The flavor of the resulting product was better and stronger than the starting material.

Sample B - A sample of 500 ml of cocoa extract was held in a pressure reactor for four hours at 135° C. at 90 psi. The resulting product was similar in strength to above Sample A but having a better flavor than the product of Sample A, with a bittersweet note. The flavor of the resulting product was estimated to be three times stronger than the flavor of the starting cocoa extract.

Sample C - A sample of 500 ml of cocoa extract was held in a pressure reactor for four hours at 150° C. at 135 psi. The resulting product had a burned, toasted flavor.

FIGS. 1 A–D is a gas chromatogram of cocoa extract which has not been subjected to present process. FIGS. 2 A–D show a gas chromatogram for the product of Sample B above, i.e., 500 ml of cocoa extract held for four hours in a pressure reactor at 135° C., at 90 psi. A comparison of FIGS. 1 A–D and FIGS. 2 A–D show a number of peaks which have increased or decreased. For example in FIG. 2, peaks have increased or decreased at abscissa numbers 6, 12.5, 17, 18.5, 23.3, 23.7, 24.5, 32.5, 38.7, 47, 49.5, 51.5. A comparison of FIGS. 1 A-D and 2 A-D show new peaks or disappeared peaks. For example, in FIG. 2 new peaks are shown at abscissa numbers 18.7, 20.3, 28, 34.7, 36.7, 49.7, 50, and 51.5. The location of a peak which disappeared is shown in FIG. 1 at abscicca number 51.

This comparison of FIGS. 1 A-D and 2 A-D clearly shows a dramatic difference in chemical properties of the starting extract upon being subjected to the present process.

EXAMPLE 2

Samples of rum were subjected to the present process under controlled operational parameters.

Sample A - A sample of 300 ml of rum was held in a pressure reactor for 4 hours at 85° C. at 120 psi. The resulting product only showed a slight difference in flavor from the starting material.

Sample B - A sample of 300 ml of rum was held in a pressure reactor for 4 hours at 135° C. at 100° psi. This resulted in a product with a stronger rum flavor than the starting material and generally more dark, woody, molasses-like, fruity characteristics than the starting material.

Sample C - A sample of 500 ml of rum was held in a pressure reactor for four hours at 150° C. at 120 psi. The resulting product was not particularly favorable.

FIGS. 3 A-C show a gas chromatogram of rum which has not been subjected to the present process. FIGS. 4 A-C show a gas chromatogram of rum from Sample B, above, which was subjected to the present process.

A comparison of the gas chromatograms shown in FIGS. 3 A-C and FIGS. 4 A-C shows numerous peaks which have increased or decreased due to the rum having been subjected to the present process. For example, in FIGS. 4 A-C, peaks which have increased or decreased are shown at abscissa numbers 7.3, 8.5, 13.3, 13.5, 13.7, 16.7, 30.3, and 37.5. This comparison of FIGS. 3 A-C and FIGS. 4 A-C clearly shows distinct chemical differences in the rum before and after being subjected to the present process.

While only a few exemplary embodiments of this invention have been described in detail, those skilled in the art will recognize that there are many possible variations and modifications which may be made in the embodiments while yet retaining many of the novel and advantageous features of this invention. Accordingly, it is intended that the following claims cover all such modifications and variations.

What is claimed is:

1. A process for enhancing the flavor of cocoa extract having an alcohol content of between 40% and 70% with the extract being free of added sugar and coloring matter comprising the step of:

heating a volume of said extract in a sealed container at a temperature between 125°-150° C. for a time period of from 3.5-4.5 hours to cause a change in flavor.

2. The process of claim 1 wherein said heating step is conducted at a pressure of 70-135 psi.

3. A flavor enhanced ethanol extract comprising a cocoa extract having an alcohol concentration of between 40 and 70% and being free of added sugar and coloring material and wherein said cocoa extract is subjected to heating in a sealed container at a temperature between 125°-150° C. for a time period of from 3.5-4.5 hours to cause a change in flavor.

4. The flavor enhanced ethanol extract of claim 3 wherein said extract is further subjected to a pressure of 70-135 psi.

* * * * *